(12) United States Patent
Hanna et al.

(10) Patent No.: US 9,325,763 B2
(45) Date of Patent: *Apr. 26, 2016

(54) INMATE INFORMATION CENTER FOR CORRECTIONAL FACILITY PROCESSING

(71) Applicant: Core Systems (NI) Limited, Belfast (IE)

(72) Inventors: Edward J. Hanna, Holywood (IE); Patricia A. O'Hagan, Crumlin (IE)

(73) Assignee: CORE SYSTEMS (NI) LIMITED, Belfast (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/694,923

(22) Filed: Apr. 23, 2015

(65) Prior Publication Data

US 2016/0028786 A1 Jan. 28, 2016

Related U.S. Application Data

(63) Continuation of application No. 13/889,117, filed on May 7, 2013, now Pat. No. 9,043,813, which is a continuation of application No. 12/859,728, filed on Aug. 19, 2010, now Pat. No. 8,458,732.

(60) Provisional application No. 61/235,286, filed on Aug. 19, 2009.

(51) Int. Cl.
*G06F 9/54* (2006.01)
*H04L 29/06* (2006.01)
*H04L 29/08* (2006.01)

(52) U.S. Cl.
CPC ............. *H04L 65/602* (2013.01); *H04L 67/32* (2013.01)

(58) Field of Classification Search
None
See application file for complete search history.

(56) References Cited

U.S. PATENT DOCUMENTS

| | | | | |
|---|---|---|---|---|
| 8,370,206 | B2 * | 2/2013 | Collins | G06Q 10/00 705/26.1 |
| 2005/0222933 | A1 * | 10/2005 | Wesby | G06Q 40/00 705/36 R |
| 2006/0184544 | A1 * | 8/2006 | Harper | G06Q 20/382 |
| 2008/0057976 | A1 * | 3/2008 | Rae | H04W 64/003 455/456.1 |
| 2010/0299761 | A1 * | 11/2010 | Shapiro | G06Q 10/107 726/28 |

* cited by examiner

*Primary Examiner* — Timothy A Mudrick
*Assistant Examiner* — Abdou Seye
(74) *Attorney, Agent, or Firm* — Kilpatrick Townsend & Stockton LLP

(57) ABSTRACT

A platform application and methods of operation that integrate both native and third-party modules into an integrated environment on an inmate computing device is disclosed. Third-party modules or systems are applications meant to operate independent from the platform application. Information is communicated between the platform application and third-party module or system to add audit, alarm and other functions across all modules or systems controlled by the platform software. The third-party module or system is audited to allow triggering of rules that cause remedial action to be taken. Triggers can be on actions not monitored by a particular third-party module or system.

20 Claims, 8 Drawing Sheets

INMATE INFORMATION CENTER FOR CORRECTIONAL FACILITY PROCESSING

This application is a Continuation Application of U.S. patent application Ser. No. 13/889,117, filed on May 7, 2013, now U.S. Pat. No. 9,043,813, entitled "INMATE INFORMATION CENTER FOR CORRECTIONAL FACILITY PROCESSING," which is a Continuation Application of U.S. patent application Ser. No. 12/859,728, filed on Aug. 19, 2010, now U.S. Pat. No. 8,458,732, entitled "INMATE INFORMATION CENTER FOR CORRECTIONAL FACILITY PROCESSING," which claims the benefit of, and is a non-provisional of, U.S. Provisional Application Ser. No. 61/235,286, filed on Aug. 19, 2009, entitled "INMATE INFORMATION CENTER," which are each hereby expressly incorporated by reference in its entirety for all purposes.

BACKGROUND

This disclosure relates in general to correctional facility processing and, but not by way of limitation, to operation of inmate accessed computing devices.

In the current economic climate, corrections facilities are seeking more cost-effective ways to incarcerate and supervise criminal offenders. By streamlining procedures staff can use their time efficiently. Within the corrections facility, there is a range of services available from many technology vendors. Retrieving information from a variety of sources can be prolonged as it is not always readily available. There is no common way to access to a range of software services to provide useful information at the touch of a button.

Many corrections facilities have integrated software systems to automate and streamline many tasks using any number of technology vendors. These software systems do not interact well with each other or legacy software systems. Different vendors have different capabilities for auditing use of their software or perhaps a few modules they might offer. Implementation of control over a number of software systems from different vendors requires each to independently add functionality. Choreographing multiple technology vendors is difficult and results are mixed.

With the increase in prison populations and cutbacks in expenditure, staff are pressed to be more efficient with their time. Inmates have a constant need for basic information and this is predominantly provided by corrections staff. The requirement to answer the same questions day-in-day-out can be demoralizing and time-consuming for corrections staff. Inmates are also frustrated by the situation as they are highly reliant on corrections staff. Response rates to inmate queries are dependent on corrections staff availability. Ideally, inmates would like immediate access to information they want without having to rely on someone else to provide it.

When dealing with high-risk offenders, staff minimize physical interaction with them. A kiosk or information center can provide much of the day-to-day information to significantly reduce the need for corrections staff to manually provide day-to-day information to offenders. Different vendors provide different kiosks such that the offenders are given access to a few information centers that require independent maintenance, configuration and support. Kiosks are not interoperable and have many overlapping functionality where each operates in a separate silo.

SUMMARY

In one embodiment, the present disclosure provides a platform application that integrates both native and third-party modules into an integrated environment on an inmate computing device. Third-party modules or systems can be applications meant to operate independent from the platform application. Information is communicated between the platform application and third-party module or system to add audit, alarm and other functions across all modules or systems controlled by the platform software. The third-party module or system is audited to allow triggering of rules that cause remedial action to be taken. Triggers can be on actions not monitored by a particular third-party module or system.

In another embodiment, the present disclosure provides an inmate computing device for correctional facilities. The inmate computing device includes a platform application, native modules, a number of application programming interface (API) translation profiles, an audit function, a number of alarm rules, and an alarm function. The platform application runs on the inmate computing device. The platform application operates at least partially in an application layer of the inmate computing device. Native modules are designed for the platform application and operate in the application layer. The number of API translation profiles is configured to integrate a plurality of third-party modules, which are not designed to natively interact with the platform application. The plurality of third-party modules uses the plurality of API translation profiles to integrate into the platform application. Each of the plurality of third-party modules is designed to operate independently from each other in the application layer. The audit function is configured to monitor the plurality of third-party modules. The plurality of alarm rules defines a plurality of triggers and a plurality of remedial actions. The alarm function is configured to perform the plurality of remedial actions upon activation of the plurality of triggers.

In still another embodiment, the present disclosure provides a method for providing computing resources to inmates at correctional facilities. In one step, a platform application is run on an inmate computing device. The platform application is configured to operate at least partially in an application layer of the inmate computing device. Information is communicated with an application programming interface (API) of a third-party module. The third-party module is: not natively designed to interact with the platform application, and designed to operate independently in the application layer. The information is processed with the platform application. The third-party module is monitored with an audit function. An alarm rule is loaded for the third-party module before processing the alarm rule. Violation of the alarm rule is detected before performing a remedial action associated with the alarm rule.

In yet another embodiment, the present disclosure provides a computer program product embodied on one or more storage media for providing computing resources to inmates at correctional facilities. There is code for the computer program product doing various functions. A platform application is has code for running on an inmate computing device. The platform application is configured with code to operate at least partially in an application layer of the inmate computing device. Information is communicated with an application programming interface (API) of a third-party module using code. The third-party module is: not natively designed to interact with the platform application, and designed to operate independently in the application layer. The information is processed with the platform application using code. The third-party module is monitored with an audit function using code. An alarm rule is loaded for the third-party module using code before processing the alarm rule. Violation of the alarm rule is detected with code before performing a remedial action associated with the alarm rule.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Where the reference label is used in the specification, the description is applicable to any one of the similar components having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
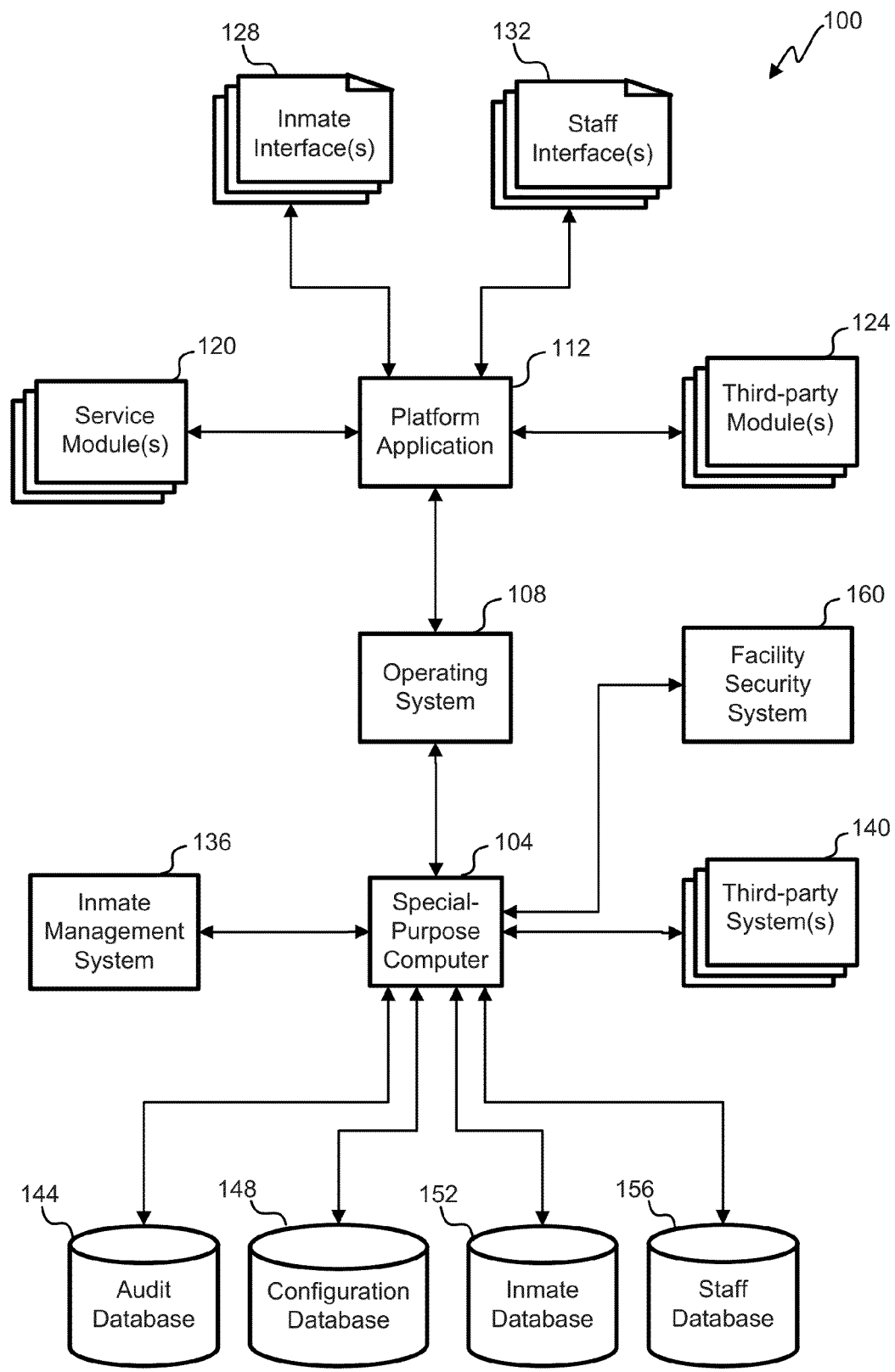
FIG. 1 depicts a block diagram of an embodiment of a correctional facility processing system.

Referring first to FIG. 1, a block diagram of an embodiment of a correctional facility processing (CFP) system 100 is shown. There can be many different configurations of CFP systems 100 customized for particular requirements of a facility. Different facilities will have different customizations of the various blocks according to those legacy systems, desired functionality, regulatory requirements, etc. Generally, a correctional facility will have a legacy inmate management system 136, correctional facility security system 160, third-party modules 124, third-party systems 140 when a platform application 112 with its service modules 120, staff and inmate interfaces 128, 132 are grafted into the CFP system 100. A new CFP system 100 could have much more of the functionality in service modules 120 rather than having to use legacy functionality.

A special-purpose computer 104 interacts with third-party systems 140, an inmate management system 136 and a correctional facility security system 160 in this embodiment. The special purpose computer 104 could be a kiosk, a handheld computer, a desktop computer, a tablet computer, a smart phone, a group of computers, a remote computer system in the cloud or otherwise remote to the user, etc. The special-purpose computer 104 is typically physically hardened if accessible by inmates and might be located in a common area or in a cell. Various input devices like a keyboard, a mouse, a touch screen, a biometric reader, a video camera, security sensors, etc. could be peripherals on the special-purpose computer 104.

The special-purpose computer 104 is attached to one or more wired or wireless networks (not shown). The special-purpose computer 104 communicates with third-party systems 140, the inmate management system 136 and correctional facility security system 160 using the one or more networks. A third-party system 140 is any system not designed to interoperate with the platform application 112. The inmate management system 136 and the correctional facility security system 160 are examples of third-party systems. Third-party systems 140 have interfaces, messaging and/or application program interfaces (APIs) to interact with other systems of the CFP system 100.

The inmate management system 136 typically performs basic functions of the correctional facility relating to inmate management. Inmate accounting, commissary, sentence planning, health records, visitation and other custom or legacy functions are part of the inmate management system 136. On occasion, functions of the inmate management system 136 are replaced with functionality elsewhere in the CFP system 100.

The correctional facility security system 160 has functions to secure the correctional facility. Video surveillance, intrusions detection, access control, biometric authentication, login authentication, lock operation, or other security functionality. The correctional facility security system 160 has an interface to allow the platform application 112 to perform certain remedial actions should an alarm rule be violated. The platform application 112 can request information on valid inmate location, command lockdown of an area, trigger saving of video surveillance, and activate other functions of the correctional facility security system 160.

An operating system 108 runs on the special-purpose computer 104, for example, LINUX™, Windows™, OS X™, or UNIX™. Other embodiment could use a secure operating system. The operating system in this embodiment is commercial grade and not particularly secure. The platform application 112 provides functionality to allow service and third-party modules 120, 124 to operate more securely.

The platform application 112 runs in the application layer of the operating system 108. Service modules 120 are functional units that can be selected individually to be part of the CFP system 100 if the corresponding functionality is desired for the correctional facility. Service modules 120 could perform most any function not performed elsewhere in the CFP system 100. The platform application 112 serves as a buffer between the operating system and service and third-party modules 120, 124. The third-party modules 124 were designed to operate without the platform application 112 and directly on the operating system 108. The third-party modules 124 are typically designed to be stand alone applications, but the platform application 112 provides additional functionality, audit, alarm, cross-module interoperability, etc. despite little native support for this functionality in the third-party modules 124.

There are two different interfaces 128, 132 in the CFP system 100 that are spread out in various locations of the correctional facility. An inmate interface 128 has limited functionality, more controls and security. Inmates can use this interface to access functionality in the service modules 120, the third-party modules 124 and third-party systems 140. Many of the third-party modules 124 and third-party systems are designed to run on different single-purpose computers, but are now accessible from the inmate interface 128. Input functions are locked down or filtered on the special-purpose computer 104 when the inmate interface is used.

The staff interface 132 is used to program or reconfigure the CFP system 100 and access information and functionality not available to inmates. The staff interfaces 132 may be physically separate from and inaccessible by inmates. There could be different levels of access to the staff interface 132 such that only staff needing access to a particular function would have that access. Through the staff interface 132, staff can remotely view the screen of an inmate, view a log of the inmate interaction, view one or more active processes of the inmate, send a message for display on a screen of the inmate or a plurality of screens for a plurality of inmates, that is displayed on top of the one or more active processes, and/or remotely kill one or more of the active processes.

The special-purpose computer 104 has access to non-volatile storage in the form of drives, network attached storage (NAS), cloud-based storage, etc. for storing various information. The information could be in files, databases, tables, etc. This embodiment has an audit database 144, a configuration database 148, an inmate database 152, and a staff database. These may be any type of data structure and could be combined or divided in any number of ways.

The audit database 114 stores audit information gathered as the CFP system 100 operates. The audit information identifies user, function used, keystrokes and other input, screen scrapes, time of interaction, rule violations, etc. Service modules 120 designed for operation with the platform application 112 typically have more integration with the audit functionality when compared to third-party modules and systems 124, 140, 136, 160. Non-native functions 124, 140, 136, 160 can still have keystrokes, API traffic and screen scrapes recorded in the audit database. Different regimes for the different users can modify the level of audit, the amount of audit information gathered and how long the audit information is stored.

The configuration database 148 stores configuration information for the various components of the CFP system 100. The various functions 120, 124, 140, 136, 160 use configuration parameters and information on how to interact with those functions 120, 124, 140, 136, 160 that is stored in the configuration database 148. The configuration database 148 can be modified by the staff, system administrators and software developers to modify operation of the functionality 124, 140, 136, 160.

The inmate database 152 stores information on all the inmates that might interact with the CFP system 100. It may also include information on those civilians that might interact with the inmates. Rights, privileges, authorizations, special accommodations, demographic information are all stored in the inmate database 152. Information used to authenticate the inmate throughout the CFP system 100 is also stored in the inmate database 152 that includes login, identification, biometric data. Incarceration details like crimes, release date, prior incarceration history, etc. is also stored.

The staff database 156 stores information on the staff that might be used within the CFP system 100. Authentication, authorization, access information is stored in the staff database in addition to payroll, demographic, service record. Third-party functions 124, 140, 136, 160 may also store information in any of the databases 144, 148, 152, 156, which may involve translation to accommodate format requirements of these functions 124, 140, 136, 160 not designed to natively operate with the platform application.

Figure 2:
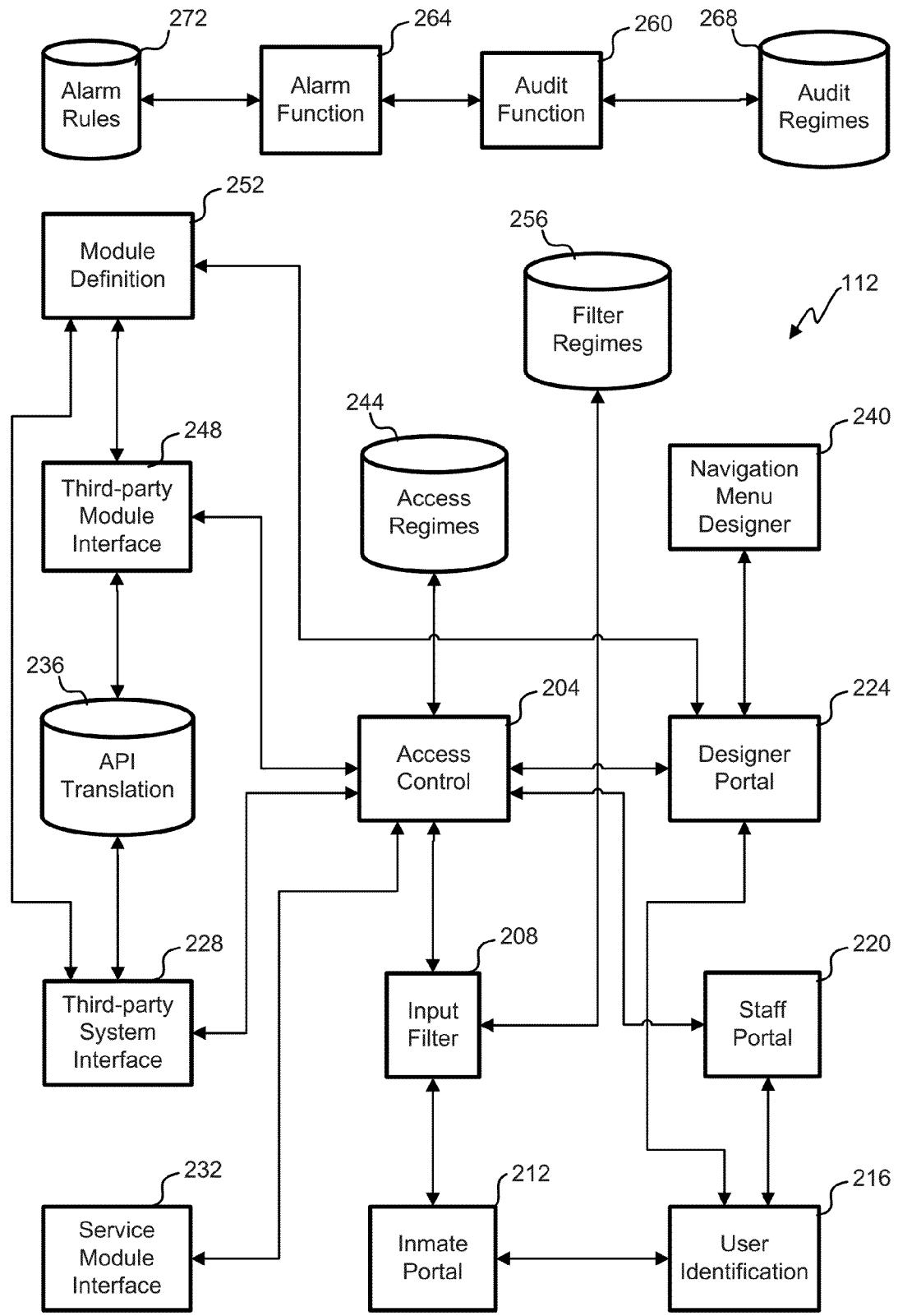
FIG. 2 depicts a block diagram of an embodiment of platform application.

With reference to FIG. 2, a block diagram of an embodiment of platform application 112 is shown. The platform application 112 is accessed by one of an inmate portal 212 coupled to the inmate interface 128 or the designer or staff portals 224 coupled to the staff interface 132. A user identification function 216 authenticates the user of the platform application 112 and can accommodate various authentication requirements, for example, login, biometric, access card, and/or any other authentication mechanism.

Once the user is identified and authenticated, the access control function 204 regulates how the user can interact with the platform software 112. The access control function 204 loads one or more access regimes 244 for the user and enforces the associated rules. For example, an inmate may have access regimes 244 that define functions 120, 124, 140, 136, 160 or classes or groups of functions, time of day/week/year that access to the platform software 112, time of day/week/year that the software platform can be accessed, the location of access allowed for the user, the interface 128, 132 allowed for this user, time on system allowed in session/day, types of content allowed/blocked, etc. Generally, an inmate user would not have access to functions like the facility security system 160. Access regimes 244 may define a number of rules such as filter regimes, audit regimes, etc. Table I shows an example of some access regimes for two prisoners.

Through the staff portal 220, a staff member can pull up information on an inmate's interaction in real-time, any historical interaction stored in the audit database 144, inventory and kill processes, and/or send messages to the inmate's screen. The staff member can view the processes or functions that are active and kill any of the processes or functions. Additionally, the staff member can view all input and output of the inmate portal 212. Staff members can view inmate interaction from several instances of the platform application 112 simultaneously. For example, the staff member may be in a control room where four, six, eight, ten, or twelve sub-screens are actively showing interaction by inmates. Certain interaction can be masked from this overview unless there is a court order. For example, an inmate's interaction with a law library module many have the content masked, but other interaction in the law library module is observable and logged.

TABLE I

Access Regime Definition for Two Example Inmates

| Inmate | Regime(s) | Rules |
|---|---|---|
| Jonathan R. Smith | Maximum Security | 30 minutes access in common areas only |
| | | Maximum audit |
| | | Minimum modules accessible |
| | | Filter regime 10 |
| | | Audit regime 17 |
| | Law Library | 2 hours of access per day |
| | Violent Media Block | TV, video and music filter |
| | Video Visitation | Service module only allows video visitation |
| Kevin A. Doe | Minimum Security | 3 hours access on any computer |
| | | Minimum audit |
| | | Access to most modules |
| | | Filter regime 2 and 3 |
| | | Audit regimes 6 and 14 |
| | Work Program | Access to work-related functions |
| | In-person Visitation | Service module allows scheduling in-person visitation |

Once the access regimes 224 define the access, the user can interact with the functions 120, 124, 140, 136. Each user may have different levels of filtering or audit of their interaction with the platform application 112. Where there are multiple filter or audit regimes specified, the higher security restrictions are used. An input filter 208 regulates the user's interaction according to filter regimes 256 assigned to that user and/or function 120, 124, 140, 136. The input filter 208 can block access to a peripheral driver, replace the peripheral driver or overlay the peripheral driver to reduce the functionality. The access regime 244 can specify the filter regime 256 to apply for peripheral use. Table II shows an example of some filter regimes 256. Filter regime 01 might be for a designer that is given relatively unrestricted access in comparison with filter regime 10. For keyboard access, some regimes would limit the interaction possible to prevent hacking or accessing locked-out functionality.

Operations of the third-party function 124, 140, 136 can be locked out by masking portions of the screen such as menus and window manipulation by skinning the windows. Locking of regions of the screen can be context sensitive such that as the application. Use of the mouse in those sections is blocked such that unauthorized functions cannot be accessed. In some cases, the interaction is intercepted and filtered. For example, activation of a print button could cause an e-mail to be sent with a virtual representation of the printout attached.

TABLE II

Filter Regime Definition Examples

| Filter Regime | Peripheral | Filter |
|---|---|---|
| 01 | Keyboard | Unrestricted |
|  | Mouse | Unrestricted |
|  | Video Camera | Available to all capable Applications |
|  | Biometric Reader | Full access |
|  | Screen Masking | None |
| 02 | Keyboard | Function access only |
|  | Mouse | No menu access for third-party functions |
|  | Video Camera | Access for visitation function only |
|  | Biometric Reader | User ID function only |
|  | Screen Masking | Mask menus and window manipulation |
| 10 | Keyboard | Restricted function access |
|  | Mouse | No menu access for third-party functions |
|  | Video Camera | No access |
|  | Biometric Reader | User ID function only |
|  | Screen Masking | Mask menus and window manipulation |

A designer accesses the platform application 112 to add access to functions through a module definition function 252. The designer selects service modules 120 and configures them according to requirements for the correctional facility. For third-party functions 124, 140, 136, 160 the designer formulates workflows and translation of information such that the platform application 112 integrates the third-party function 124, 140, 136, 160 cohesively. The information for melding the third-party functions 124, 140, 136, 160 is stored in an API translation store 236. For example, an authentication function in a third-party system 140 could use login, but the user identification function 216 could use biometric access. The designer would enter the proper login information for the third-party system 140 if the biometric verification was successful.

A third-party module interface 248 and a third-party system interface 228 couple the platform application 112 to any third-party functions 124, 140, 136. When third-party functions 124, 140, 136 are accessed, the input is filtered according to the filter regimes 256 and API translation 236 is performed. The third-party functions 124, 140, 136 can be instantiated into a virtual machine in some embodiments. In other embodiments, the displayed interface is taken from the third-party function 124, 140, 136 and presented to the user through the platform application 112.

The designer can additionally design navigation menus to present the functionality to the users. A navigation menu designer 240 is used the by the designer to embed the various functions into the graphical user interface (GUI). The user interacts with the GUI to choose an application to use. Different users have access to different functions such that the GUI will present different options to different users as defined by the access regime(s) 244 active for the user.

The platform application 112 provides audit and alarm functionality for native service modules 120 as well as third-party functions 124, 140, 136. Service modules 120 designed to operate with the platform software 112 and fully support audit functionality. All functions 120, 124, 140, 136 can be audited even when there may be little or no audit functionality designed into the function 120, 124, 140, 136. Different users or classes of users can have different audit regimes 268 applied to their use of the platform application 112. Table III gives examples of some audit regimes 268. For audit regime 17, all possible audit is performed along with key capture for one month retention. Other embodiments could keep different audit information for different periods of time.

TABLE III

Audit Regime Definition for Two Example Inmates

| Audit Regime | Peripheral | Audit |
|---|---|---|
| 06 | Service Modules | Minimal |
|  | TP Functions | Minimal |
|  | Key Capture | None |
|  | Screen Scrape | None |
|  | Retention | 1 day |
| 14 | Service Modules | Minimal |
|  | TP Functions | Full |
|  | Key Capture | Full except law library |
|  | Screen Scrape | 10 second frequency |
|  | Retention | 1 week |
| 17 | Service Modules | Full |
|  | TP Functions | Full |
|  | Key Capture | Full |
|  | Screen Scrape | 5 second frequency |
|  | Retention | 1 month |

An alarm function 264 monitors the audit information to determine if remedial action should be taken. Alarm rules 272 define what conditions or steps would trigger remedial action. Table IV gives examples of some rules. The audit regime 268 defines which rules will be applied for different functions 120, 124, 140, 136, 160 and/or users. Some rules are universal, but others are specific to users or groups of users. The alarm function can integrate with any number of functions 120, 124, 140, 136, 160 to determine triggers. For example, the correctional facility security system uses card keys to know who is physically located in a particular area. Should a user not be known by the correctional facility security system to be in a particular area where they are accessing the platform software 112, the inmate management system 136 could be notified and a third-party system that captures video could be commanded to capture additional video and retain it.

TABLE IV

Audit Alarm Rules

| Trigger | Remedial Action |
|---|---|
| Command line access | Log out user |
| Control-Alt-Delete Key Combination | Increase screen scrape frequency |
| Unexpected close of window | Return to main menu |
| Window stops responding | Reboot computer |
| Unexpected window opens | Close function and return to main menu |

TABLE IV-continued

Audit Alarm Rules

| Trigger | Remedial Action |
| --- | --- |
| Access programming functions from staff or inmate portals | Log out user and notify staff |
| User not physically allowed to access this location | Notify staff of breach in physical security |
| User in controlled area, but correctional facility security system does not know user is in area with physical access | Capture video surveillance of area, activate maximum audit and notify staff of breach |

Figure 3:
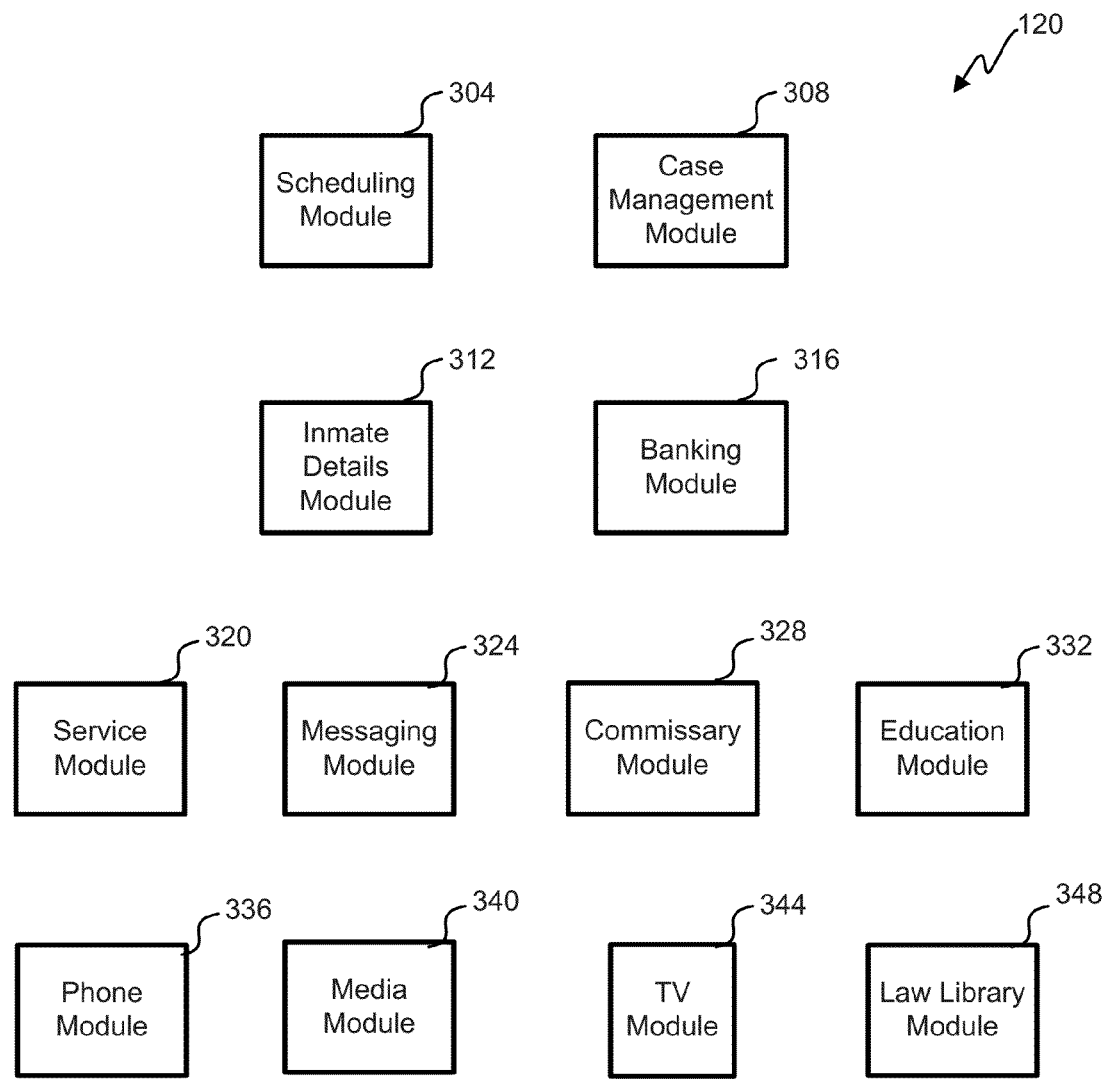
FIG. 3 depicts a block diagram of an embodiment of service modules.

Referring next to FIG. 3, a block diagram of an embodiment of various service modules 120 is shown that can be selected for a given correctional facility using the platform application. These service modules 120 can be added or removed according to the design of the CFP system 100. Additionally, some of the different service modules 120 can be customized for a given correctional facility. Where there are existing third-party functions 124, 140, 136, 160, the equivalent service module 120 may not be used, but could later be substituted. Some correctional facilities will require additional service modules 120 to be designed for a particular application.

Common to most installations are a scheduling module 304, a inmate details module 312, a case management module 308, and a banking module. The scheduling module 304 allows both inmates and staff to schedule appointments. An inmate can access the scheduling module to request appointments, see what appointments have been scheduled by staff and add other events to their calendar. An inmate details module 312 has demographic information on an inmate, along with incarceration details, location information for the inmate, etc. The case management module 308 lets the inmate look up their release date, rehabilitation goals, parole board information, etc. The banking module holds the trust account for the inmate. Contributions to the trust account can be accessed through the banking module and used for payment when using other functions 120, 124, 140, 136.

Any number of other modules 120 are possible. This embodiment includes a service module 320, a messaging module 324, a commissary module 328, an education module 332, a phone module 336, media module 340, a television (TV) module 344, and a law library module 348. The service module has various forms that allow, for example, making complaints and requesting service. The messaging module 324 allows communication within the correctional facility and outside the correctional facility for some inmates with the appropriate access regime 244. Friends and relatives can use the messaging module 324 through another portal accessible outside the correctional system.

The commissary module 328 allows the inmate to interact with the commissary for special dietary requirements and scheduling. The education module 332 is used for scheduling live education or performing remote teaching. Phone services are provided through a phone module 336. Music and video can be ordered and played through the media module 340. Access to the TV is provided through the TV module. The law library module 348 provides information for inmates to use in their legal defense.

Figure 4A:
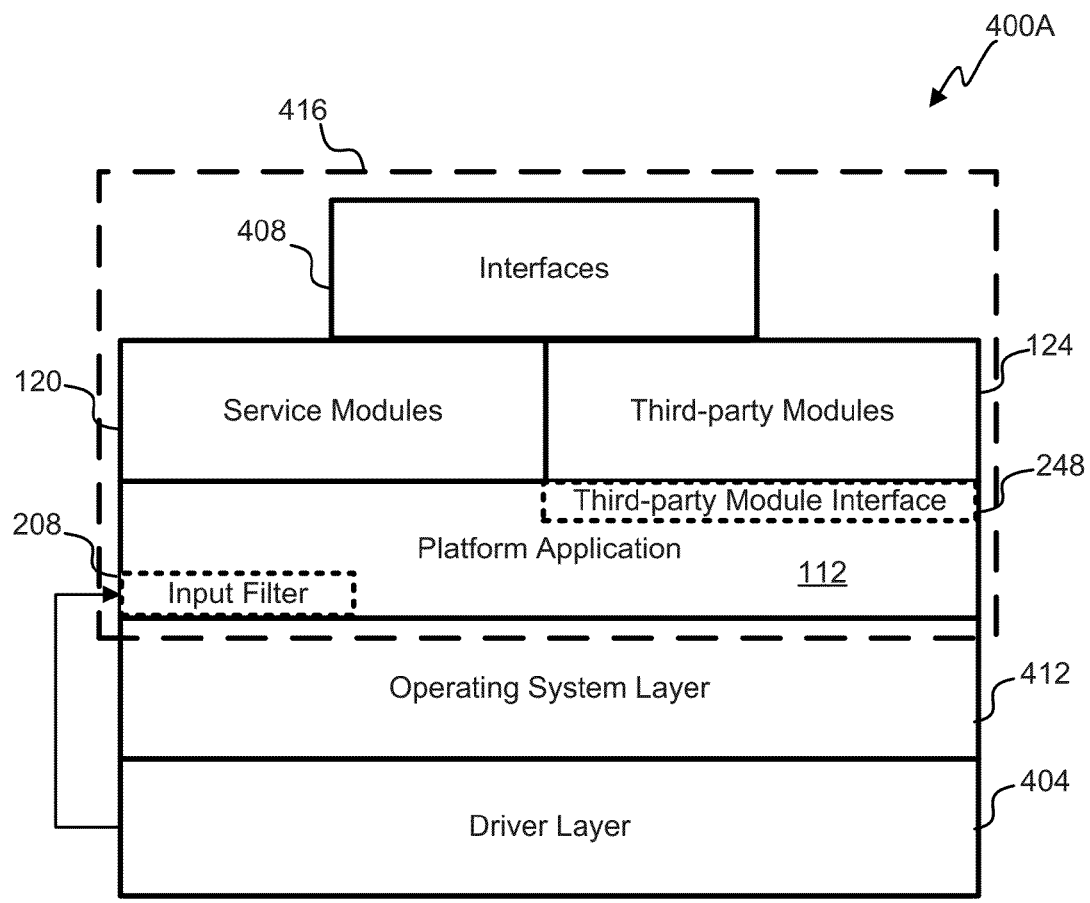
FIGS. 4A and 4B depict block diagrams of embodiments of software layer structures for an inmate computing device.

With reference to FIG. 4A, a diagram of an embodiment of software layer structure 400A for an inmate computing device is shown. There is a driver layer 404, an operating system layer 412 and an application layer 416. Third-party modules 124 are designed to run independent from the platform application 112 within the application layer 416. After the platform application 112 is loaded and properly configured, the third modules 124 are buffered from direct interaction with the operating system and driver layers 412, 404 in whole or in part. The platform application 112 can encapsulate the third-party module 124 within a virtual machine, for example, where interaction can be captured and/or modified. The interfaces 408 include the inmate interface(s) 128 and staff interface(s) 132 and possibly an interface for friends and relatives of the inmates.

Most of the detail in the platform application 112 is not shown here, except the input filter 208 and the third-party module interface 248. The input filter 208 communicates with one or more drivers in the driver layer 404 to screen out some input. For example, a keyboard driver in the driver layer 404 sends keystrokes to the input filter 208 which may or may not pass the information based upon the active filter regime(s) 256. In one example, the inmate may press control-alt-delete key combination that would normally cause the operating system to give the user access to system-level functions, but the input filter 208 would prevent those keystrokes from reaching the operating system layer 412.

The third-party modules 124 have their input and output taken over by a third-party module interface 248, in whole or in part. The instantiation of the third-party module can be better controlled by the platform application 112 through interception of the traffic intending to go directly to the operating system or drive layers 412, 404. Some third-party modules 124 have APIs to accommodate data and command exchange and the third-party module interface 248. Those third-party modules 124 without known APIs can have their traffic intercepted and changed as necessary.

Figure 4B:
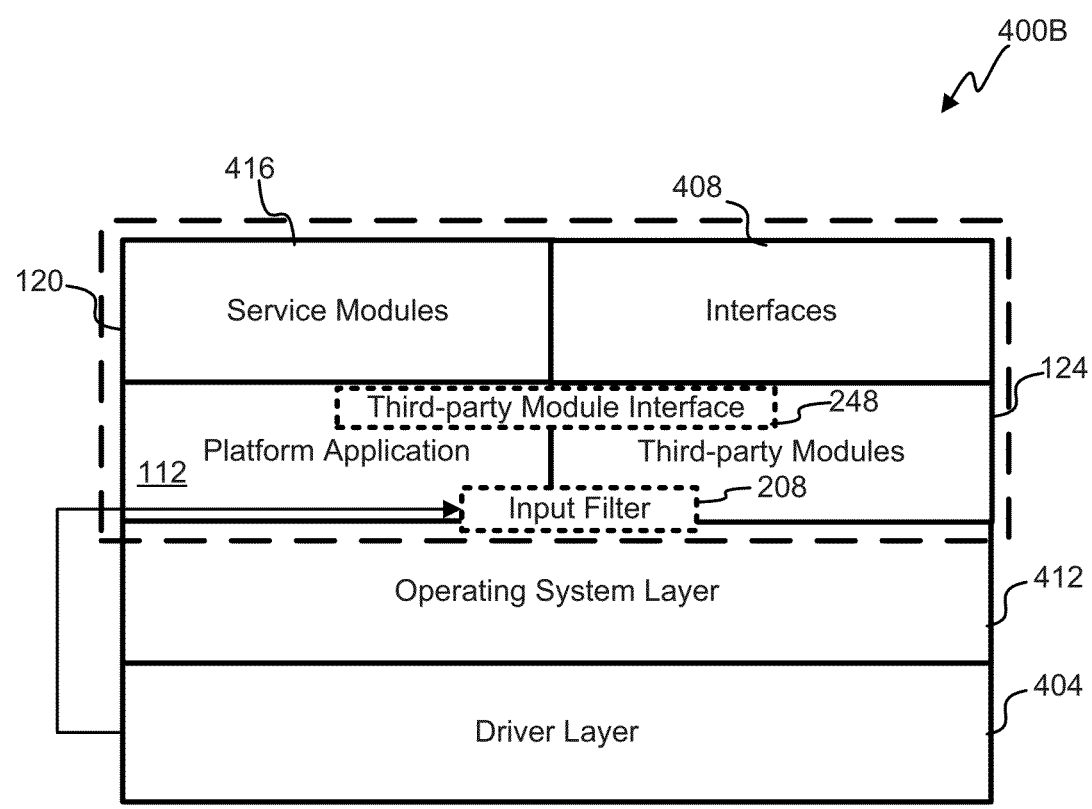

With reference to FIG. 4B, a diagram of another embodiment of software layer structure 400B for an inmate computing device is shown. In this embodiment, the third-party module 124 is less buffered from direct interaction with the operating system layer 412. The third-party module interface 248 interacts with known APIs in the third party modules 124 and performs some input filtering, but the third party modules 124 can otherwise directly interface with the operating system layer 412. The input filter 208 could be drivers that proxy between the third-party modules 124 the driver layer 404 filtering certain things, but otherwise appearing to the third-party modules 124 as a normal driver.

Figure 5:
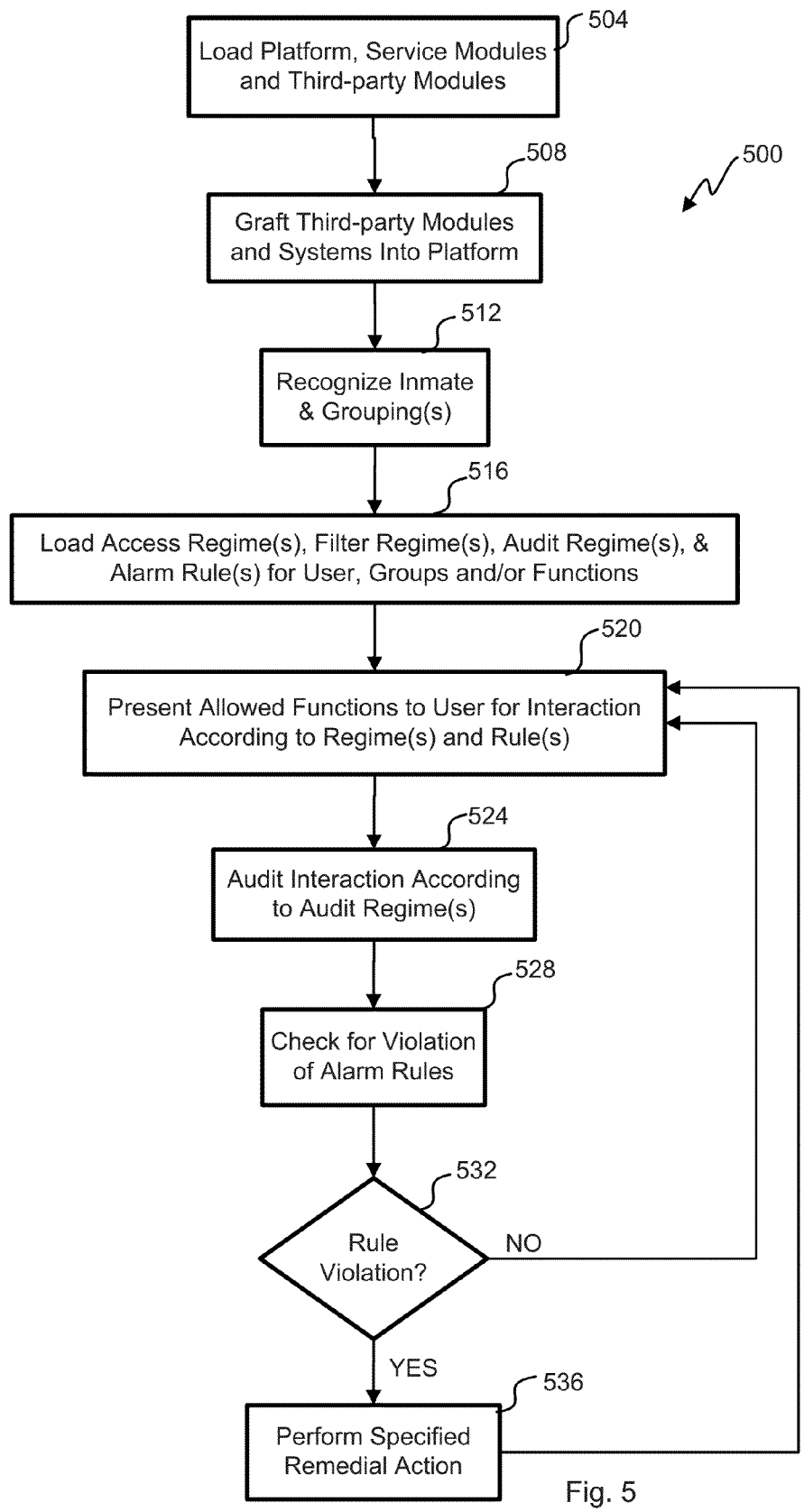
FIG. 5 illustrates a flowchart of an embodiment of a process for controlling inmate access to the inmate computing device.

Referring next to FIG. 5, a flowchart of an embodiment of a process 500 for controlling inmate access to the inmate computing device is shown. The depicted portion of the process begins in block 504, where the special-purpose computer 104 is booted and the applications and drivers are loaded. The platform software 112 is loaded prior to the service modules 120 and third-party modules 124. The service modules 120 and third-party modules 124 operate through the platform software 112. The relevant API translations are loaded in block 508 to graft the third-party modules and systems 124, 140, 136, 160 into the platform application 112. At this point, the CFP system 100 is ready for use.

In block 512, a user passes through the user identification function 216 and is identified individually and as part of any groups. Access, filter, and audit regimes 244, 256, 268 are loaded along with alarm rules 272 for the user, any groups and relevant functions 120, 124, 140, 136, 160. These various regimes and rules 244, 256, 268, 272 customize the user experience with the CFP system 100 in block 520. As interaction happens, it is audited by the audit function 260 according to the audit regimes 268 in block 524. The alarm function 264 observes the audit information from the audit function 260 to check for alarm rules 272 being violated.

In block 532, it is determined if a alarm rule 272 is violated. These checks are continual in normal operation. Where no alarm rule 272 is triggered, processing loops back to block 520. Where it is determined in block 532 that a rule has been violated, processing goes to block 536 to perform the specified remedial action. Unless the remedial action specifies otherwise, processing goes to block 520 after the remedial action is performed. Although not shown, the CFP system 100 waits for another user after looping back to block 512 when the current user stops interaction or logs out.

Figure 6:
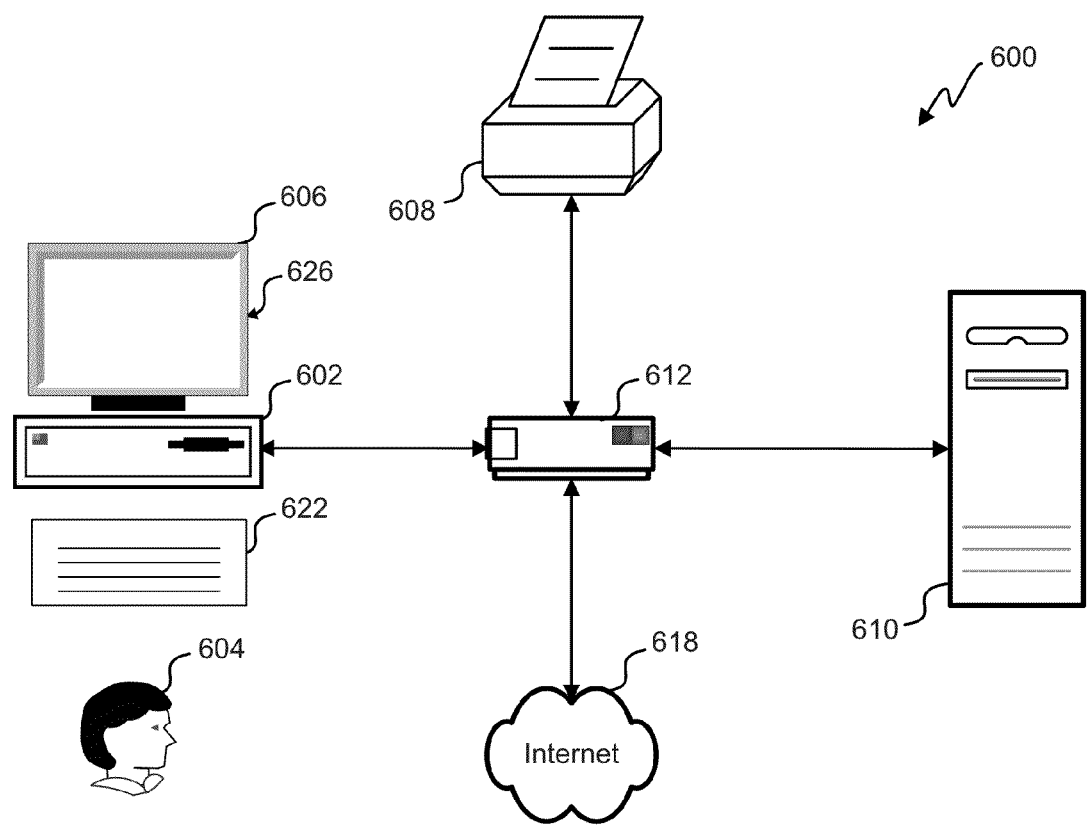
FIG. 6 depicts a block diagram of an embodiment of a correctional facility system.

Referring next to FIG. 6, an exemplary environment with which embodiments of the invention may be implemented is shown with a correctional facility system 600 that can be used by a designer 604 to design, for example, electronic circuits. The correctional facility system 600 can include a computer 602, keyboard 622, a network router 612, a printer 608, and a monitor 606. The monitor 606, processor 602 and keyboard 622 are part of a computer system 626, which can be a laptop computer, desktop computer, handheld computer, mainframe computer, etc. The monitor 606 can be a CRT, flat screen, etc.

A circuit designer 604 can input commands into the computer 602 using various input devices, such as a mouse, keyboard 622, track ball, touch screen, etc. If the correctional facility system 600 comprises a mainframe, a designer 604 can access the computer 602 using, for example, a terminal or terminal interface. Additionally, the computer system 626 may be connected to a printer 608 and a server 610 using a network router 612, which may connect to the Internet 618 or a WAN.

The server 610 may, for example, be used to store additional software programs and data. In one embodiment, software implementing the systems and methods described herein can be stored on a storage medium in the server 610. Thus, the software can be run from the storage medium in the server 610. In another embodiment, software implementing the systems and methods described herein can be stored on a storage medium in the computer 602. Thus, the software can be run from the storage medium in the computer system 626. Therefore, in this embodiment, the software can be used whether or not computer 602 is connected to network router 612. Printer 608 may be connected directly to computer 602, in which case, the computer system 626 can print whether or not it is connected to network router 612.

Figure 7:
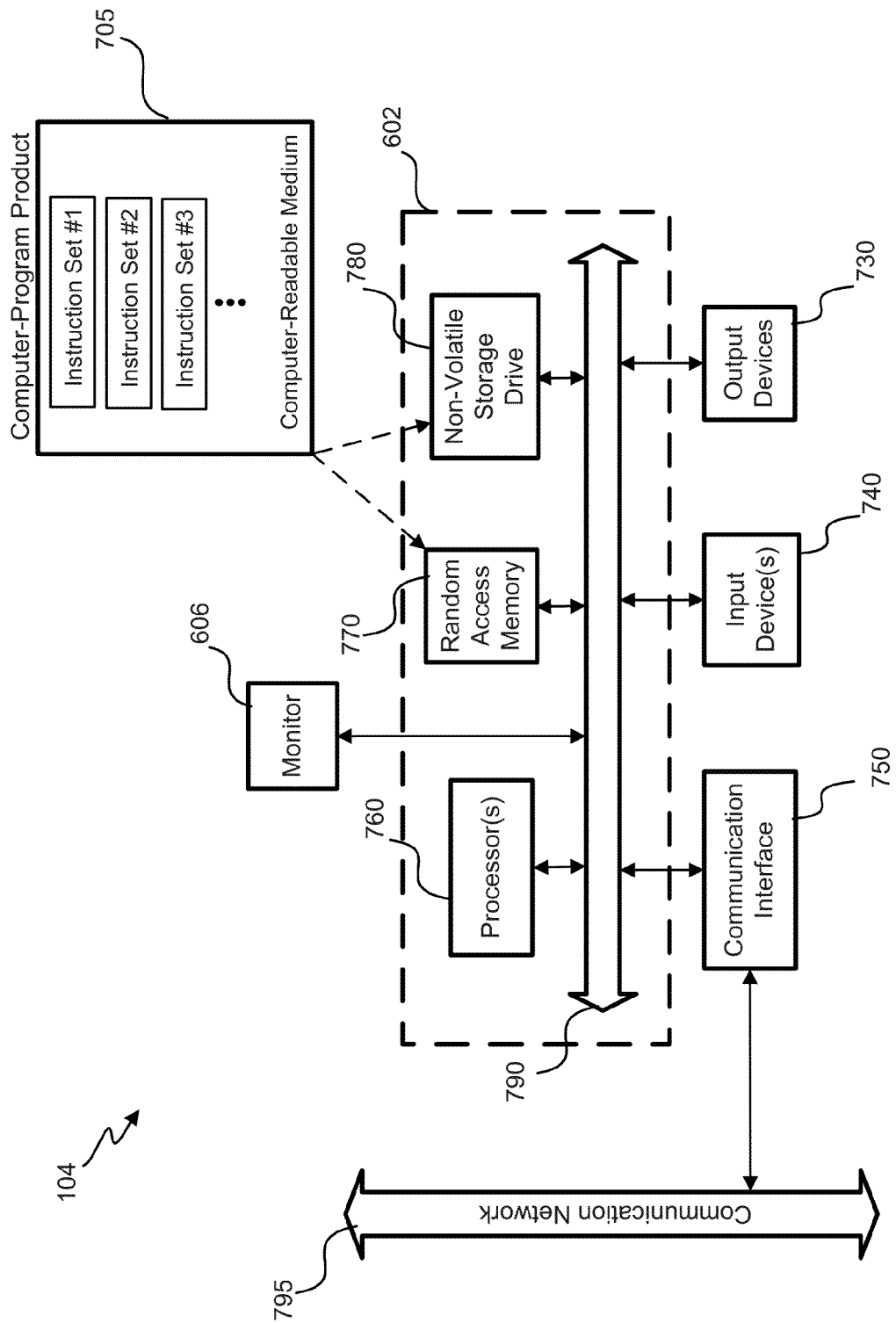
FIG. 7 depicts a block diagram of an embodiment of a special-purpose computer system.

With reference to FIG. 7, an embodiment of a special-purpose computer system 104 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 626, it is transformed into the special-purpose computer system 104 to perform correctional facility processing.

Special-purpose computer system 104 comprises a computer 602, a monitor 606 coupled to computer 602, one or more additional user output devices 730 (optional) coupled to computer 602, one or more user input devices 740 (e.g., keyboard, mouse, track ball, touch screen) coupled to computer 602, an optional communications interface 750 coupled to computer 602, a computer-program product 705 stored in a tangible computer-readable memory in computer 602. Computer-program product 705 directs system 104 to perform the above-described methods. Computer 602 may include one or more processors 760 that communicate with a number of peripheral devices via a bus subsystem 790. These peripheral devices may include user output device(s) 730, user input device(s) 740, communications interface 750, and a storage subsystem, such as random access memory (RAM) 770 and non-volatile storage drive 780 (e.g., disk drive, optical drive, solid state drive), which are forms of tangible computer-readable memory.

Computer-program product 705 may be stored in non-volatile storage drive 780 or another computer-readable medium accessible to computer 602 and loaded into memory 770. Each processor 760 may comprise a microprocessor, such as a microprocessor from Intel® or Advanced Micro Devices, Inc.®, or the like. To support computer-program product 705, the computer 602 runs an operating system that handles the communications of product 705 with the above-noted components, as well as the communications between the above-noted components in support of the computer-program product 705. Exemplary operating systems include Windows® or the like from Microsoft Corporation, Solaris® from Sun Microsystems, LINUX, UNIX, and the like.

User input devices 740 include all possible types of devices and mechanisms to input information to computer system 602. These may include a keyboard, a keypad, a mouse, a scanner, a digital drawing pad, a touch screen incorporated into the display, audio input devices such as voice recognition systems, microphones, and other types of input devices. In various embodiments, user input devices 740 are typically embodied as a computer mouse, a trackball, a track pad, a joystick, wireless remote, a drawing tablet, a voice command system. User input devices 740 typically allow a user to select objects, icons, text and the like that appear on the monitor 606 via a command such as a click of a button or the like. User output devices 730 include all possible types of devices and mechanisms to output information from computer 602. These may include a display (e.g., monitor 606), printers, non-visual displays such as audio output devices, etc.

Communications interface 750 provides an interface to other communication networks and devices and may serve as an interface to receive data from and transmit data to other systems, WANs and/or the Internet 618. Embodiments of communications interface 750 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 750 may be coupled to a computer network, to a FireWire® bus, or the like. In other embodiments, communications interface 750 may be physically integrated on the motherboard of computer 602, and/or may be a software program, or the like.

RAM 770 and non-volatile storage drive 780 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 770 and non-volatile storage drive 780 may be configured to store the basic programming and data constructs that provide the functionality of various embodiments of the present invention, as described above.

Software instruction sets that provide the functionality of the present invention may be stored in RAM 770 and non-volatile storage drive 780. These instruction sets or code may be executed by the processor(s) 760. RAM 770 and non-volatile storage drive 780 may also provide a repository to store data and data structures used in accordance with the present invention. RAM 770 and non-volatile storage drive 780 may include a number of memories including a main random access memory (RAM) to store of instructions and data during program execution and a read-only memory (ROM) in which fixed instructions are stored. RAM 770 and non-volatile storage drive 780 may include a file storage subsystem providing persistent (non-volatile) storage of program and/or data files. RAM 770 and non-volatile storage drive 780 may also include removable storage systems, such as removable flash memory.

Bus subsystem 790 provides a mechanism to allow the various components and subsystems of computer 602 communicate with each other as intended. Although bus subsystem 790 is shown schematically as a single bus, alternative embodiments of the bus subsystem may utilize multiple busses or communication paths within the computer 602.

A number of variations and modifications of the disclosed embodiments can also be used. For example, different functions can be located at different locations. Some functions can be shared within a prison system. For example, the messaging module could be used systemwide and available to multiple correctional facilities at the same time. Some of the platform application may be distributed among a number of computing devices. For example, a staff portal may be on a different computer than the inmate portal.

While the principles of the disclosure have been described above in connection with specific apparatuses and methods, it is to be clearly understood that this description is made only by way of example and not as limitation on the scope of the disclosure.

What is claimed is:

1. A correctional facility content management system comprising:
    one or more processors;
    memory coupled to the one or more processors;
    an inmate computing device configured to provide one or more user interfaces, the inmate computing device comprising a network interface to connect to the one or more processors via a network;
    a platform application running on the inmate computing device that includes instructions stored in the inmate computing device and to be executed by the one or more processors and/or one or more processors included in the inmate computing device, wherein the platform application operates at least partially in an application layer;
    a plurality of modules comprising:
        one or more native modules, which are designed for the platform application, wherein the one or more native modules operate in the application layer; and
        one or more third-party modules, which are not designed to natively interact with the platform application;
        wherein at least one module of the plurality of modules is configured to control access by the inmate computing device to data and/or media via the network; and
    a plurality of access regimes defining rules regulating one or more modules of the plurality of modules, wherein:
        at least one access regime of the plurality of access regimes defines rules regulating the access to data and/or media; and
        each access regime of the plurality of access regimes is a function of one or more of an identity of third-party module, an identity of native module, an identity of inmate computing device, an identity of inmate, and/or a location.

2. The correctional facility content management system of claim 1, wherein the at least one module of the plurality of modules that is configured to control access by the inmate computing device to data and/or media via the network comprises:
    a first module configured to facilitate ordering and/or playing of music content, video content, and/or audiovisual content; and/or
    a second module configured to facilitate access to data and/or media pertinent to an inmate's legal case.

3. The correctional facility content management system of claim 1, wherein the at least one module of the plurality of modules corresponds to a third-party module that operates on a third-party system separate from the inmate computing device.

4. The correctional facility content management system of claim 1, wherein the at least one module of the plurality of modules corresponds to a web application, hosted by the one or more processors or by a third-party system separate from the inmate computing device, to provide access to the inmate computing device in accordance with the at least one access regime of the plurality of access regimes defines rules regulating the access to data and/or media.

5. The correctional facility content management system of claim 1, wherein the at least one access regime of the plurality of access regimes defining rules regulating the access to data and/or media comprises:
    a first access regime that is a function of at least an identity of a first third-party module; and
    a second access regime that is different from the first access regime and that is a function of at least an identity of a second third-party module;
    wherein the first third-party module is different from the second third-party module.

6. The correctional facility content management system of claim 1, further comprising a staff interface that remotely allows monitoring and/or controlling of access by the inmate computing device to data and/or media via the network, allowing one or more of:
    viewing of a display of the inmate computing device;
    viewing a log of inmate interaction via the inmate computing device;
    viewing one or more active processes;
    sending a message for display on a screen of the inmate computing device, displayed on top of the one or more active processes; and/or
    remotely controlling one or more of the active processes.

7. The correctional facility content management system of claim 1, wherein the inmate computing device comprises one or more of a handheld computer, a tablet computer, and/or a smartphone.

8. The correctional facility content management system of claim 1, wherein the network comprises a wireless network.

9. One or more non-transitory, machine-readable media having machine-readable instructions thereon which, when executed by one or more processors, cause the one or more processors to:
    operate a platform application configured to run on an inmate computing device that includes instructions stored in the inmate computing device and to be executed by the one or more processors and/or one or more processors included in the inmate computing device, wherein the platform application operates at least partially in an application layer, the inmate computing device configured to provide one or more user interfaces and to connect to the one or more processors via a network;

operate a plurality of modules comprising:
  one or more native modules, which are designed for the platform application, wherein the one or more native modules operate in the application layer; and
  one or more third-party modules, which are not designed to natively interact with the platform application;
  wherein at least one module of the plurality of modules is configured to control access by the inmate computing device to data and/or media via the network; and
enforce a plurality of access regimes defining rules regulating one or more modules of the plurality of modules, wherein:
  at least one access regime of the plurality of access regimes defines rules regulating the access to data and/or media; and
  each access regime of the plurality of access regimes is a function of one or more of an identity of third-party module, an identity of native module, an identity of inmate computing device, an identity of inmate, and/or a location.

10. The one or more non-transitory, machine-readable media of claim 9, wherein the at least one module of the plurality of modules that is configured to control access by the inmate computing device to data and/or media via the network comprises:
  a first module configured to facilitate ordering and/or playing of music content, video content, and/or audiovisual content; and/or
  a second module configured to facilitate access to data and/or media pertinent to an inmate's legal case.

11. The one or more non-transitory, machine-readable media of claim 9, wherein the at least one module of the plurality of modules corresponds to a third-party module that operates on a third-party system separate from the inmate computing device.

12. The one or more non-transitory, machine-readable media of claim 9, wherein the at least one module of the plurality of modules corresponds to a web application, hosted by the one or more processors or by a third-party system separate from the inmate computing device, to provide access to the inmate computing device in accordance with the at least one access regime of the plurality of access regimes defines rules regulating the access to data and/or media.

13. The one or more non-transitory, machine-readable media of claim 9, wherein the at least one access regime of the plurality of access regimes defining rules regulating the access to data and/or media comprises:
  a first access regime that is a function of at least an identity of a first third-party module; and
  a second access regime that is different from the first access regime and that is a function of at least an identity of a second third-party module;
  wherein the first third-party module is different from the second third-party module.

14. The one or more non-transitory, machine-readable media of claim 9, the one or more processors to further execute instructions to facilitate a staff interface that remotely allows monitoring and/or controlling of access by the inmate computing device to data and/or media via the network, allowing one or more of:
  viewing of a display of the inmate computing device;
  viewing a log of inmate interaction via the inmate computing device;
  viewing one or more active processes;
  sending a message for display on a screen of the inmate computing device, displayed on top of the one or more active processes; and/or
  remotely controlling one or more of the active processes.

15. The one or more non-transitory, machine-readable media of claim 9, wherein the inmate computing device comprises one or more of a handheld computer, a tablet computer, and/or a smartphone.

16. The one or more non-transitory, machine-readable media of claim 9, wherein the network comprises a wireless network.

17. A method for correctional facility content management, the method comprising:
  operating a platform application configured to run on an inmate computing device that includes instructions stored in the inmate computing device and to be executed by the one or more processors and/or one or more processors included in the inmate computing device, wherein the platform application operates at least partially in an application layer, the inmate computing device configured to provide one or more user interfaces and to connect to the one or more processors via a network;
  operating a plurality of modules comprising:
    one or more native modules, which are designed for the platform application, wherein the one or more native modules operate in the application layer; and
    one or more third-party modules, which are not designed to natively interact with the platform application;
    wherein at least one module of the plurality of modules is configured to control access by the inmate computing device to data and/or media via the network; and
  enforcing a plurality of access regimes defining rules regulating one or more modules of the plurality of modules, wherein:
    at least one access regime of the plurality of access regimes defines rules regulating the access to data and/or media; and
    each access regime of the plurality of access regimes is a function of one or more of an identity of third-party module, an identity of native module, an identity of inmate computing device, an identity of inmate, and/or a location.

18. The method of claim 17, wherein the at least one module of the plurality of modules that is configured to control access by the inmate computing device to data and/or media via the network comprises:
  a first module configured to facilitate ordering and/or playing of music content, video content, and/or audiovisual content; and/or
  a second module configured to facilitate access to data and/or media pertinent to an inmate's legal case.

19. The method of claim 17, wherein the at least one module of the plurality of modules corresponds to a third-party module that operates on a third-party system separate from the inmate computing device.

20. The method of claim 17, wherein the at least one module of the plurality of modules corresponds to a web application, hosted by the one or more processors or by a third-party system separate from the inmate computing device, to provide access to the inmate computing device in accordance with the at least one access regime of the plurality of access regimes defines rules regulating the access to data and/or media.

* * * * *